United States Patent
Öijer

(10) Patent No.: US 7,627,311 B2
(45) Date of Patent: Dec. 1, 2009

(54) IMAGE ACQUISITION FOR CONTACTS LIST

(75) Inventor: Sten Fredrik Öijer, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 625 days.

(21) Appl. No.: 11/381,212

(22) Filed: May 2, 2006

(65) Prior Publication Data

US 2007/0259654 A1 Nov. 8, 2007

(51) Int. Cl.
*H04M 3/42* (2006.01)

(52) U.S. Cl. ............ 455/415; 455/418; 455/420; 455/517; 348/14.01

(58) Field of Classification Search ............ 455/415, 455/414.1–414.4, 416–418, 420, 517–519; 380/270; 348/14.01
See application file for complete search history.

(56) References Cited

U.S. PATENT DOCUMENTS

| | | | | |
|---|---|---|---|---|
| 2005/0014493 A1* | 1/2005 | Ford | ............ | 455/418 |
| 2006/0121926 A1* | 6/2006 | Joung | ............ | 455/518 |
| 2006/0189348 A1* | 8/2006 | Montulli et al. | ............ | 455/556.1 |
| 2007/0064947 A1* | 3/2007 | King et al. | ............ | 380/270 |
| 2007/0155415 A1* | 7/2007 | Sheehy et al. | ............ | 455/518 |

FOREIGN PATENT DOCUMENTS

| | | |
|---|---|---|
| EP | 1 641 225 | 3/2006 |
| KR | 10-2004-0105952 | 12/2004 |

OTHER PUBLICATIONS

PCT/IB2006/054049 International Search Report with Written Opinion, Jun. 5, 2007, 12 pages.
XP-000906111 "Display End User On Cellular Telephone (Radio)", Motorola Publication, Jun. 1999, K. Krollman et al., p. 241.
International Preliminary Report on Patentability dated Aug. 13, 2008 issued for corresponding international application No. PCT/IB2006/054049, 8 pages.
XP-000906111 "Display End User On Cellular Telephone (Radio)", Motorola Publication, Jun. 1999.

* cited by examiner

*Primary Examiner*—Matthew D Anderson
*Assistant Examiner*—Shaima Q Aminzay
(74) *Attorney, Agent, or Firm*—Harrity & Harrity, LLP

(57) ABSTRACT

A method for populating a contacts list with information may include receiving an input identifying a first contact in a contacts list stored in a first communication device. The method may also include automatically generating a first message requesting that the first contact provide a picture in response to the received input and transmitting the first message to a second communication device associated with the first contact. The method may further include receiving a picture from the second communication device and storing the picture in the first communication device.

19 Claims, 4 Drawing Sheets

IMAGE ACQUISITION FOR CONTACTS LIST

TECHNICAL FIELD OF THE INVENTION

The invention relates generally to communications and, more particularly, to populating a contacts list with information.

DESCRIPTION OF RELATED ART

Communication devices, such as cellular telephones, have become increasingly versatile. For example, cellular telephones often include applications that enable users to obtain information, such as directions to a place of interest, sports scores and weather related information. Communication devices may also include applications that allow users to exchange messages, such as text messages, e-mail messages, etc. Such applications have made communication devices increasingly important to users.

SUMMARY

According to one aspect, a method may include receiving an input identifying a first contact in a contacts list stored in a first communication device. The method may also include automatically generating a first message requesting that the first contact provide a picture in response to the received input and transmitting the first message to a second communication device associated with the first contact. The method may further include receiving a picture from the second communication device and storing the picture in the first communication device.

Additionally, the method may include displaying the picture with information associated with the first contact when the contacts list is accessed.

Additionally, the automatically generating a first message may include automatically generating the first message in response to the received input when the first communication device is in a mode associated with adding pictures to the contacts list.

Additionally, the automatically generating a first message may include generating a multimedia message service message including a code identifying the first message as a request for a picture.

Additionally, the method may include receiving a second message from the second communication device, determining that the second message is a request for a picture and displaying information indicating that a picture is requested in response to the second message.

Additionally, the determining may include automatically determining that the second message is a request for a picture based on a code included with the second message.

Additionally, the method may include automatically generating messages associated with a plurality of contacts in the contacts list at predetermined intervals, each of the messages requesting a picture and transmitting the messages to the plurality of contacts.

Additionally, the storing may include automatically storing the picture in the contacts list without input from a user associated with the first communication device.

Additionally, the first communication device may be a mobile terminal.

According to another aspect, a mobile terminal may be provided. The mobile terminal may include a memory configured to store information identifying a plurality of parties. The mobile terminal may also be configured to automatically generate a first message requesting that a first one of the plurality of parties provide a picture in response to at least one of a received input identifying the first party or a preset configuration associated with the first party. The mobile terminal may further include a transmitter configured to transmit the first message to a communication device associated with the first party.

Additionally, the mobile terminal may include a receiver configured to receive a picture from the communication device in response to the first message. The mobile terminal may be further configured to store the picture in the memory.

Additionally, the mobile terminal may further include a display configured to display the picture with information associated with the first party when the memory is accessed.

Additionally, the mobile terminal may include a receiver configured to receive a picture in response to the first message. The mobile terminal may be further configured to identify the first party associated with the received picture and automatically store the picture in the memory with information associated with the first party.

Additionally, when automatically generating the first message, the mobile terminal may be configured to insert a code in the first message, the code identifying the first message as a request for a picture.

Additionally, the mobile terminal may include a receiver configured to receive a second message from the communication device, and the mobile terminal may be further configured to determine that the second message is a request for a picture. The mobile terminal may further include a display configured to display information indicating that a picture is requested.

Additionally, the mobile terminal may be further configured to automatically determine that the second message is a request for a picture based on a code included with the second message.

Additionally, the mobile terminal may be further configured to automatically generate messages associated with at least some of the plurality of parties stored in the memory, where each of the messages requests a picture. The transmitter may be further configured to periodically transmit the messages to the plurality of parties.

According to a further aspect, a computer-readable medium having stored thereon sequences of instructions is provided. The instructions, when executed by at least one processor, cause the at least one processor to automatically generate, in response to input identifying a first one of a plurality parties or based on a preset configuration, a first message requesting that the first party provide a picture. The instructions also cause the at least one processor to forward the first message for transmission to a communication device associated with the first party and receive a picture from the communication device in response to the first message. The instructions further cause the at least one processor to store the picture in a memory.

Additionally, the memory may comprise a contacts list storing information associated with the plurality of parties. The computer-readable medium may further include instructions for causing the at least one processor to retrieve the picture for display with information associated with the first party when the contacts list is accessed.

Additionally, when automatically generating the first message in response to input identifying the first party, the instructions cause the at least one processor to automatically generate the first message when the computer-readable medium is in a mode associated with adding pictures to a contacts list that includes the plurality of parties.

Additionally, the memory may comprise a contacts list including information associated with the plurality of parties, and when storing the picture, the instructions may cause the at least one processor to automatically store the picture in the contacts list with information associated with the first party without input from a user.

Additionally, when generating the first message, the instructions cause the at least one processor to generate a multimedia message service message including a code identifying the first message as a request for a picture.

Additionally, the computer-readable medium may further include instructions for causing the at least one processor to receive a second message from the communication device and output information indicating that a picture is requested in response to the second message.

Additionally, the computer-readable medium may further include instructions for causing the at least one processor to automatically determine that the second message is a request for a picture based on a code included with the second message.

Additionally, the computer-readable medium may include instructions for causing the at least one processor to periodically generate messages associated with the plurality of parties based on the preset configuration, the plurality of parties comprising at least a portion of parties included in a contacts list, each of the messages requesting a picture. The instructions may further cause the at least one processor to forward the messages for transmission to the plurality of parties.

According to yet another aspect, a device may include means for receiving information identifying a first party in a contacts list stored in the device and means for automatically generating a first message in response to the received information, where the first message requests that the first party provide a picture. The device may also include means for transmitting the first message to a second device associated with the first party and means for receiving a picture from the second device. The device may further include means for automatically storing the picture in the contacts list.

Additionally, the device may include means for receiving a second message from the second communication device, means for automatically determining that the second message is a request for a picture and means for outputting information indicating that a picture is requested in response to the second message.

According to still another aspect, a communication device may include a memory configured to store information associated with a plurality of parties. The communication device may also be configured to automatically generate a first message in response to at least one of an input identifying a first one of the plurality of parties or a state associated with the first party, where the first message requests that the first party provide a picture. The communication device may also include a transmitter configured to transmit the first message to a second device associated with the first party and a receiver configured to receive a picture from the second device. The mobile terminal may be further configured to store the picture in the memory.

Additionally, the mobile terminal may be further configured to receive messages associated with at least some of the plurality of parties, where the messages each include a picture. The mobile terminal may be further configured to automatically identify one of the plurality of parties associated with each of the respective pictures and store each of the respective pictures in the memory with information associated with each of the respective identified parties.

Additionally, the state associated with the first party indicates whether the memory includes a picture associated with the first party. The mobile terminal may be configured to automatically generate the first message when the state associated with the first party indicates that the memory does not include a picture for the first party.

Additionally, the communication device may further comprise an input device configured to receive input for programming an update interval associated with at least some of the plurality of parties, the update interval identifying how often the mobile terminal is to automatically generate messages for transmission to the at least some of the plurality of parties and wherein each of the messages requests a picture.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
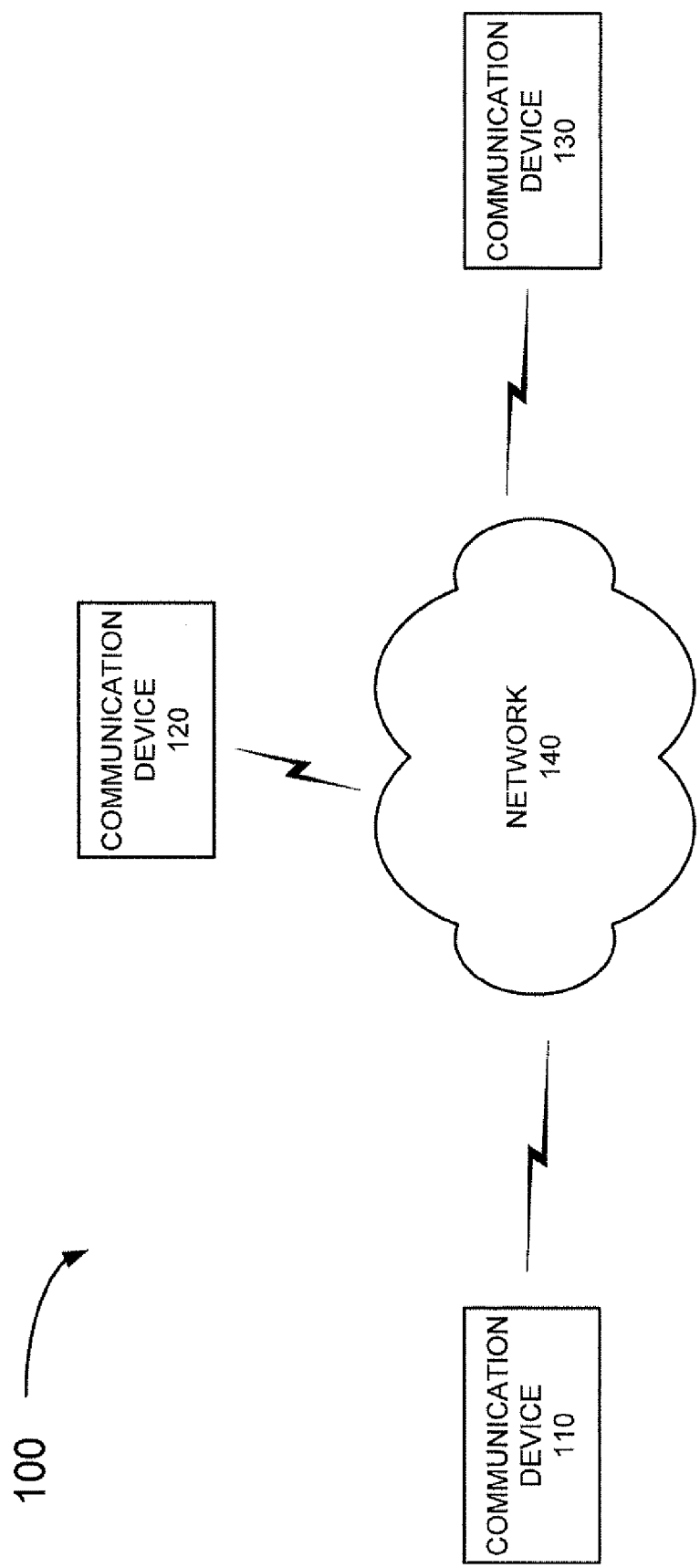
FIG. 1 is a diagram of an exemplary system in which methods and systems consistent with the invention may be implemented.

FIG. 1 is a diagram of an exemplary system 100 in which methods and systems consistent with the invention may be implemented. System 100 may include communication devices 110, 120 and 130 connected via network 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Communication devices 110-130 may each include any type of conventional device that is able to communicate via a network. For example, communication devices 110-130 may include any type of device that is capable of transmitting and receiving data (e.g., voice, text, images, multi-media data) to/from network 140. In an exemplary implementation, one or more of communication devices 110-130 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

In an alternative implementation, one or more of communication devices 110-130 may include any client device, such as a personal computer (PC), a laptop computer, a PDA, a web-based appliance, etc., that is able to transmit and receive data via network 140. Communication devices 110, 120 and 130 may communicate with each other over network 140 via wired, wireless or optical connections.

Network 140 may include one or more networks including a cellular network, a satellite network, the Internet, a telephone network, such as the Public Switched Telephone Network (PSTN), a metropolitan area network (MAN), a wide area network (WAN), a local area network (LAN) or another type of network. In an exemplary implementation, network 140 includes a cellular network that uses components for transmitting data to and from communication devices 110, 120 and 130. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Figure 2:
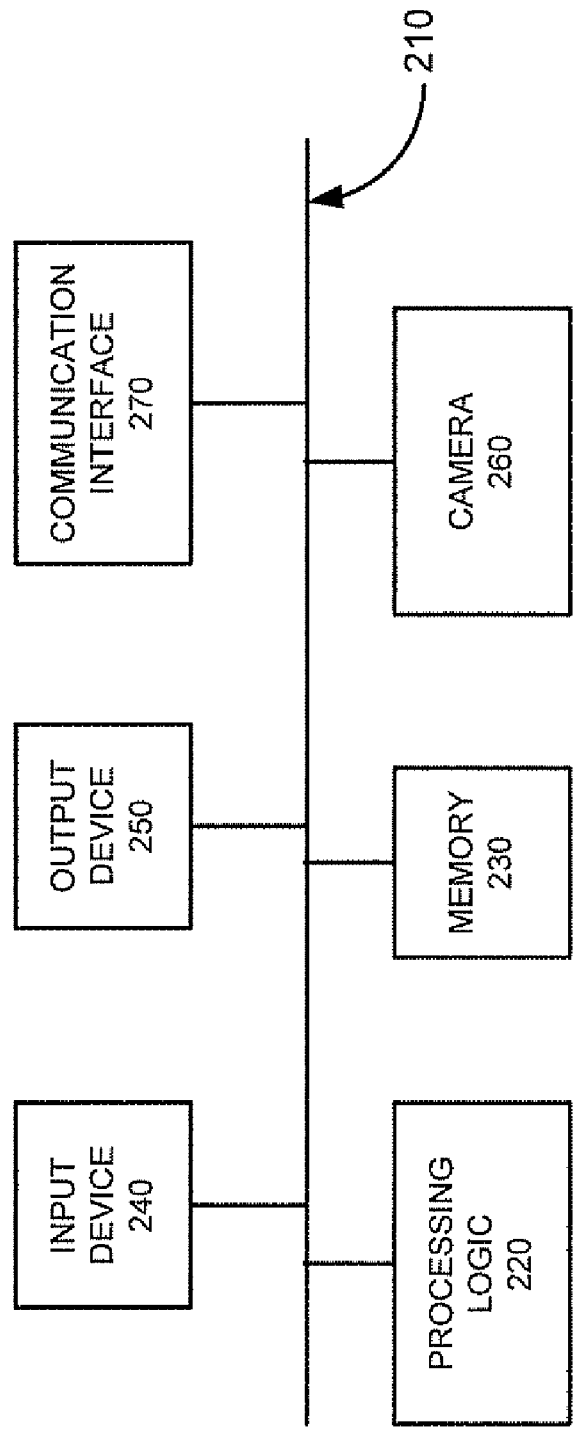
FIG. 2 is a diagram of an exemplary communication device of FIG. 1 according to an implementation consistent with the invention.

FIG. 2 is a diagram of communication device 110 according to an exemplary implementation consistent with the invention. It should be understood that communication devices 120 and 130 may include the same or similar elements and may be configured in the same or a similar manner. Communication device 110 may include bus 210, processing logic 220, memory 230, input device 240, output device 250, camera 260 and communication interface 270. Bus 210 permits communication among the components of communication device 110. One skilled in the art would recognize that communication device 110 may be configured in a number of other ways and may include other or different elements. For example, communication device 110 may include one or more power supplies (not shown). Communication device 110 may also include a modulator, a demodulator, an encoder, a decoder, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of communication device 110.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220

Input device 240 may include any mechanism that permits an operator to input information to communication device 110, such as a microphone, a keyboard, a keypad, a mouse, a pen, voice recognition and/or biometric mechanisms, etc. Input device 240 may also include one or more buttons that allow a user to receive a menu of options via output device 250. The menu may allow the user to select various functions or modes associated with applications executed by communication device 110.

Output device 250 may include one or more conventional mechanisms that output information to the user, including a display, a printer, one or more speakers, etc. Output device 250 may also include a vibrator mechanism that causes communication device 110 to vibrate.

Camera 260 may include conventional camera elements that enable communication device 110 to take pictures. Camera 260 may store the pictures in, for example, memory 230 or in another memory.

Communication interface 270 may include any transceiver-like mechanism that enables communication device 110 to communicate with other devices and/or systems. For example, communication interface 270 may include a modem or an Ethernet interface to a LAN. Alternatively, communication interface 270 may include other mechanisms for communicating via a network, such as a wireless network. For example, communication interface 270 may include one or more radio frequency (RF) transmitters and receivers and/or transceivers.

Communication device 110, consistent with the invention, may perform processing associated with populating a user's contacts list or phone book with pictures associated with the various parties stored in the contacts list, as described in detail below. Communication device 110 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the invention. Thus, implementations consistent with the invention are not limited to any specific combination of hardware circuitry and software.

Figure 3:
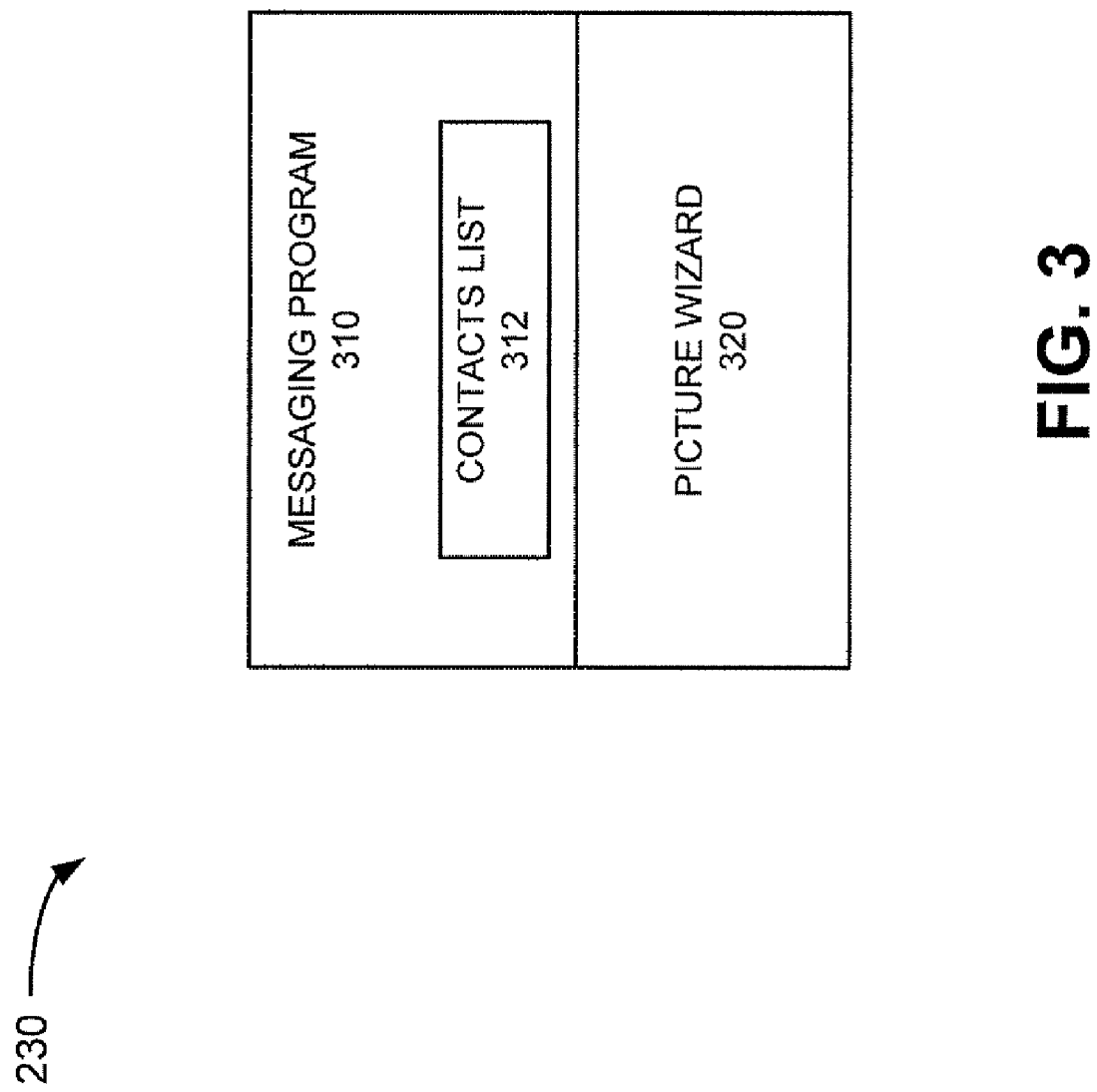
FIG. 3 is a an exemplary functional block diagram of components implemented in the communication device of FIG. 2 according to an implementation consistent with the invention.

FIG. 3 is an exemplary functional block diagram of components implemented in the communication device of FIG. 2, such as in memory 230, according to an implementation consistent with the invention. Referring to FIG. 3, memory 230 may include a messaging program 310 and a picture wizard 320. Messaging program 310 may include any type of messaging program used to transmit and receive messages to/from other devices, such communication devices 120 and 130. For example, messaging program 310 may include a multimedia message service (MMS) based program, a short message service (SMS) based program, an instant messaging (IM) based program, an e-mail program, or another application program that allows communication device 110 to communicate with other devices.

In an exemplary implementation, messaging program 310 may include a contacts list 312. Contacts list 312 may include a list of parties or contacts, such as a personal phone book, a personal address book, etc., that stores names and other information/identifiers that facilitate communications with other parties. For example, contacts list 312 may store names and/or telephone numbers, screen names, e-mail addresses, etc., of parties with which the user of communication device 110 frequently communicates. The identifiers (e.g., telephone numbers, screen names, e-mail addresses, etc.) may be used by messaging program 310 to contact various parties.

According to an exemplary implementation, picture wizard 320 may be an application program that provides a user friendly interface that allows users to add information, such as graphics, pictures, etc., for one or more of the parties identified in contacts list 312. In some implementations, picture wizard 320 may be part of messaging program 310. In other implementations, picture wizard 320 may be an external program that may interface with any number of messaging programs, such as messaging program 310, to facilitate populating contacts list 312 with information (e.g., pictures), as described in detail below. In addition, picture wizard 320 may be used to extract and store pictures in any type of format, such as joint photographic expert group (JPEG) images, graphic interchange format (GIF) images, targeted image file format (TIFF) images, portable network graphic (PNG) images, or any other type of image formats.

Figure 4:
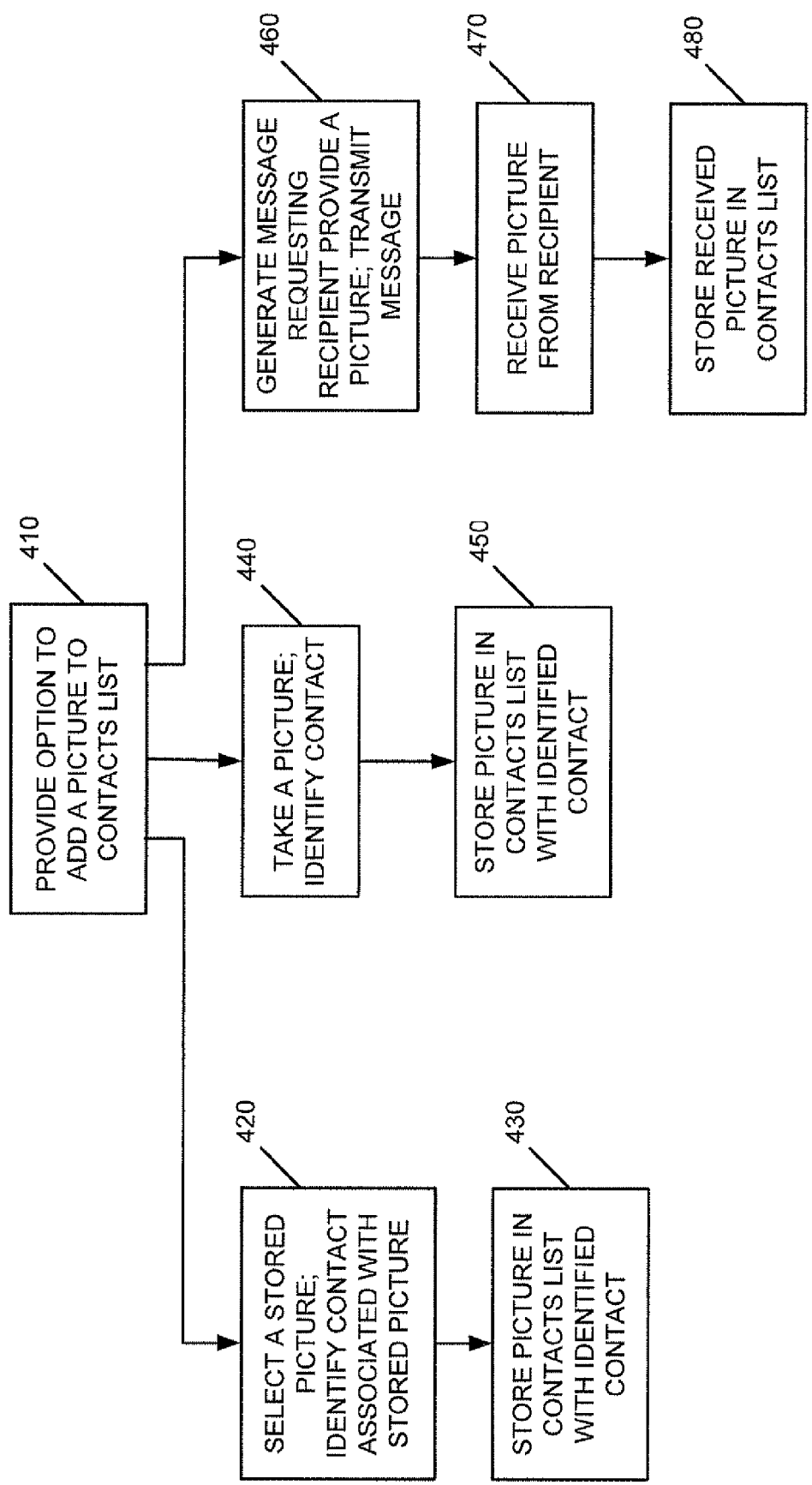
FIG. 4 is a flow diagram illustrating exemplary processing by communication devices consistent with the invention.

FIG. 4 is a flow diagram illustrating exemplary processing by communication devices, such as communication device 110, in an implementation consistent with the invention. Processing may begin when communication device 110 powers up. Assume that messaging program 310 includes a feature in which the user can include pictures with contacts listed in contacts list 312. Further assume that the user of communication device 110 would like to populate his/her contacts list 312 with pictures of his/her contacts. In an exemplary implementation, the user may open contacts list 312. Picture wizard 320 may then provide the user with an option or mode for adding pictures to contact list 312 (act 410).

For example, picture wizard 320 may provide a menu that includes an option for the user to add a picture to contacts list 312, such as an option labeled "Add Picture". The menu may allow the user of communication device 110 to select a picture stored on communication device 110 for inclusion in contacts list 312. For example, memory 230 may store a number of pictures of friends, family members, etc., of the user of communication device 110. In this case, assume that the user selects a particular one of the pictures that are stored in memory 230 (act 420). The user may also identify the particular contact with which the picture is associated (act 420). For example, if the picture is associated with Jane Smith, the user may identify Jane Smith as being the appropriate contact. The user may accomplish this by clicking on one of the contacts stored in contacts list 312 before or after the picture is selected. Picture wizard 320 may then store the selected picture in contacts list 312 along with the particular contact's stored information (act 430). The picture of the contact may then be displayed to the user when the user accesses contacts list 312 and/or begins creating a message to send to the appropriate contact. Alternatively, picture wizard 320 may store a link to the picture that a user can select to view the contact's picture.

The menu provided to the user at act 410 may also allow the user of communication device 110 to take a new picture that will be included in contacts list 312. If the user selects this option, communication device 110 may activate a camera mode associated with camera 260 and allow the user to take a picture associated with a particular contact included in contacts list 312. This option may be useful when the user of communication device 110 meets one of his/her friends included in contacts list 312. Assume that the user takes a picture using camera 260 included in communication device 110 (act 440). After the user takes the picture, picture wizard 320 may prompt the user to identify a particular contact associated with the picture. The user of communication device 110 may then identify the appropriate contact in contacts list 312 associated with the picture (act 440). Picture wizard 320 may then store the new picture, or a link to the new picture, in contacts list 312 along with the user's contact information (act 450).

The menu provided at act 410 may also include an option for allowing the user to send a message to a particular contact requesting that the contact provide a picture. This may be particularly useful in situations where a user wants to quickly populate contacts list 312 with pictures without having to physically take pictures of each of his/her contacts. In addition, many of the contacts may want to control the picture that others may use of them in their contacts list. Therefore, this option may allow the user to provide the picture of his/her choice. This option may further allow the user to automatically request pictures of his/her contacts and to automatically populate contacts list 312 with pictures, as described in detail below. Assume that the user selects this option.

The user may then select one or more contact in contacts list 312 identifying one or more parties for which the user would like to add a picture. Picture wizard 320 may then automatically generate a message for each of the selected contacts, such as an MMS message, an SMS message, an IM, an e-mail message or another type of message, that requests that the recipient of the message provide a picture to the sender (act 460). For example, picture wizard 320 may generate a message that states "Please reply to this message with a picture of yourself that I can add to your entry in my phone book". In some implementations, the sender's name may be included in the message. For example, the message may be prefaced with a statement, such as "Bill Jones would like a picture of you". In situations where the user has selected more than one contact by, for example, clicking on a number of contacts stored in contacts list 312, picture wizard 320 may automatically generate a similar message for each of the selected contacts. Picture wizard 320 may then send the messages to the identified parties/contacts (act 460). In this manner, picture wizard 320 may allow the user to efficiently send out messages requesting pictures to any number of parties in contacts list 312 by merely selecting the desired parties.

Assume that the recipient of one of the messages is associated with communication device 120. In this case, the user of communication device 120 may receive the message and select a stored picture for inclusion in a response message. Alternatively, the user of communication device 120 may take a new picture of himself/herself and forward this picture with the reply message. For example, if communication device 120 includes a camera (e.g., camera 260), the user may take a picture of himself/herself using the camera. In some implementations, after the user has taken the picture, communication device 120 may display the picture and prompt the user with a message such as "Would you like to send this picture to Bill Jones?" Assume that the user selects yes. In this case, communication device 120 may transmit the picture to communication device 110. Other recipients of the received messages may send back pictures to communication device 110 in a similar manner.

Communication device 110 may receive the picture(s) (act 470). For example, picture wizard 320 may receive pictures from a number of communication devices, such as communication devices 120 and 130. For each received message, picture wizard 320 may identify the source of the received message and determine that the source was affiliated with a particular contact in contacts list 312. For example, picture wizard 320 may identify the source of the message based on information included in the header of the received message and may compare the source to information included in contacts list 312. Picture wizard 320 may also automatically extract the picture included in the reply message or included as an attachment with the reply message and may automatically store the received picture with the appropriate contact in contacts list 312 (act 480).

In this manner, when the user opens his/her contacts list or begins composing a message to a particular contact, a picture of the contact will be displayed to the user via, for example, output device 250. Communication device 110 may perform similar processing associated with other contacts stored in contacts list 312. In this manner, the user of communication device 110 may quickly populate contacts list 312 with pictures.

In some implementations, communication device 110 may communicate with other communication devices that include the same messaging program 310. For example, assume that both of communication devices 110 and 120 are mobile terminals made by the same manufacturer and that each of communication devices 110 and 120 include the same messaging program 310 and picture wizard 320. In this implementation, if the user of communication device 110 transmits a request for picture message to communication device 120, communication device 120 may recognize the particular type of message. For example, the message transmitted by communication device 110 may include a code or some identifier that corresponds to a request for a picture message that will be recognized by communication device 120. Communication device 120 may identify the particular code and may display a message to the user indicating that the sender is requesting a picture from the user for his/her contacts list. This use of particular codes associated with the add picture function may increase the processing speed associated with decoding and displaying the received messages. That is, communication device 120 may identify the particular code and immediately display a message to the recipient that a picture is requested. The user of communication device 120 may then take a picture of himself/herself or retrieve a stored picture of himself/ herself and send the picture to communication device 110. Similarly, a code may be included in the response message that is recognized by communication device 110 as being a response to the earlier message (i.e., the request for picture message). Communication device 110 may then automatically extract the picture and include the picture in contacts list 312 with the appropriate contact. In this manner, users of communication devices that include the same messaging program and/or picture wizard may add pictures to a contacts list in a very efficient manner.

In some implementations, communication device 110 may be configured to send out request for picture messages to parties listed in contacts list 312 at predetermined intervals. For example, communication device 110 may be configured to automatically prompt the user at a predetermined interval (e.g., every 6 months, once a year, once every two years or some other interval) regarding requesting new pictures for the various parties in contacts list 312. In this implementation, the user may select the particular interval of time at which the prompt is received. In addition, the user may also enter information into picture wizard 320 regarding the periodic updates indicating particular ones of the contacts in contacts list 312 to which the messages will be sent or may enter information indicating that the periodic update messages should be sent to all of the contacts listed in contacts list 312. Further, picture wizard 320 may allow the user to enter different update intervals for different contacts. For example, for one contact in contacts list 312, the user may enter an interval of six months at which the periodic update message will be sent, while for another contact, the user may enter an interval of one year. In this manner, picture wizard 320 may allow the user to program the particular interval and contacts in any way he/she chooses. Communication device 110 may then automatically prompt the user as to whether he/she would like to send the request for picture messages to the desired contacts at the predetermined intervals. This enables the user of communication device 110 to update his/her pictures in contacts list 312 at regular intervals.

In another implementation, once the user has selected the predetermined interval at which he/she would like to request updated/new pictures for the desired contacts (e.g., either all of the contacts in contacts list 312 or a selected contacts in contacts list 312), communication device 110 may automatically send out the messages requesting new pictures without further input from the user. In this manner, picture wizard 320 may allow a user to add/update pictures to contacts list 312 with little to no input from the user.

In still another implementation, each time communication device 110 receives a message from a party not contained in contacts list 312, picture wizard 320 may prompt the user with an inquiry as to whether a picture is desired. For example, assume that the user of communication device 130 sends a message to communication device 110. Messaging program 310 and/or picture wizard 320 may determine that communication device 110 has not received any previous messages from communication device 120 and/or that the party associated with communication device 130 is not included in contacts list 312. In this case, picture wizard 320 may automatically generate a request for picture message and prompt the user of communication device 110 if he/she would like to add the party to contacts list 312 and request a picture of the party associated with communication device 130. If the user answers yes, communication device 110 may transmit the request for picture message to communication device 130.

In another implementation, picture wizard 320 may be configured by the user to automatically generate a request for picture message when communication device 110 receives a message from a party not contained in contacts list 312 or from a contact in contacts list 312 that does not include a picture or a recent picture. In still another alternative, picture wizard 320 may periodically scan contacts list 312 and identify the state of contacts list 312, such as determine which contacts do not include a stored picture. For each contact without a stored picture, picture wizard 320 may automatically generate a request for picture message and transmit the messages to the appropriate contacts. In this implementation, the user may optionally pre-configure picture wizard 320 to provide a prompt to the user before sending out the request for picture message. This may be beneficial if the user does not want to send out request for picture messages to certain contacts stored in his/her contacts list 312.

Although not described above, it should be understood that communication device 110 may receive requests for pictures from other communication devices, such as communication devices 120 and 130. In this manner, users of communication devices 110-130 may share pictures in a two way manner.

CONCLUSION

Implementations consistent with the invention allow a user to populate a contacts list in a user friendly manner. This may make it more likely that the user will actually use a picture feature associated with a messaging program. In addition, aspects consistent with the invention enable a user to obtain and save pictures in a contacts list in a manner that requires little to no input by the user. This may increase a user's satisfaction level with respect to using the picture feature of a messaging program.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been described in the context of a communication device populating a contacts list with pictures. The invention, however, may be used to associate other types of information with contacts. For example, in other implementations, video information, a music file, an animation image, multi-media data or some other type of information may be included with a contact in contacts list 312. In this manner, a user of a messaging program may view a picture, a video, a brief sound clip, an animated image or some other information when viewing contacts in contact list 312.

Further, while series of acts have been described with respect to FIG. 4, the order of the acts may be varied in other implementations consistent with the invention. Moreover, non-dependent acts may be performed in parallel.

It will also be apparent to one of ordinary skill in the art that aspects of the invention, as described above, may be implemented in, for example, computer devices, cellular communication devices/systems, methods, and/or computer program products. Accordingly, the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method comprising:
   receiving, via a first communication device, an input identifying a first contact in a contacts list stored in the first communication device;
   automatically generating, via the first communication device, a first message requesting that the first contact provide a picture in response to the received input, the message including a first code identifying the first message as a request for a picture;
   transmitting, via the first communication device, the first message to a second communication device associated with the first contact;
   receiving, via the first communication device, a second message from the second communication device, the second message including a first picture and a second code indicating that the second message is a response to the request for a picture;
   storing, via the first communication device, the first picture in the first communication device;
   receiving, via the first communication device and from the second communication device, a third message, the third message including the first code;
   automatically determining, via the first communication device, that the third message is a request for a picture based on the first code; and
   automatically displaying, via the first communication device and in response to the third message, information indicating that a picture is requested.

2. The method of claim 1, further comprising:
   displaying the first picture with information associated with the first contact when the contacts list is accessed.

3. The method of claim 1, where the automatically generating a first message comprises:
   automatically generating the first message in response to the received input when the first communication device is in a mode associated with adding pictures to the contacts list.

4. The method of claim 1, wherein the automatically generating a first message comprises:
   generating a multimedia message service message including the first code.

5. The method of claim 1, further comprising:
   automatically generating messages associated with a plurality of contacts in the contacts list at predetermined intervals, each of the messages requesting a picture; and
   transmitting the messages to the plurality of contacts.

6. The method of claim 1, where the storing comprises:
   automatically storing the first picture in the contacts list without input from a user associated with the first communication device.

7. The method of claim 1, where the first communication device comprises a mobile terminal.

8. A first communication device comprising:
   a memory to store information identifying a plurality of parties;
   a processor to:
      automatically generate a first message requesting that a first one of the plurality of parties provide a picture in response to at least one of a received input identifying the first party or a preset configuration associated with the first party, the first message including a first code corresponding to a request for a picture;
   a transmitter to:
      transmit the first message to a second communication device associated with the first party;
   a receiver to:
      receive a first picture in response to the first message, and
      receive a second message from the second communication device, the second message including the first code,
   where the processor is further to:
      identify the first party associated with the first picture, automatically store the first picture in the memory with information associated with the first party, and automatically determine that the second message is a request for a picture based on the first code included in the second message; and a display to display information indicating that a picture is requested in response to the second message.

9. The first communication device of claim 8, where the display is further to:

display the first picture with information associated with the first party when the memory is accessed.

10. The first communication device of claim 8, where the processor is further to:

automatically generate messages associated with at least some of the plurality of parties stored in the memory, each of the messages requesting a picture, where the transmitter is further to:

periodically transmit the messages to the plurality of parties.

11. The first communication device of claim 8, where the processor is further to:

receive messages associated with at least some of the plurality of parties, the messages each including a picture, and automatically identify one of the plurality of parties associated with each of the respective pictures, and store each of the respective pictures in the memory with information associated with each of the respective identified parties.

12. The first communication device of claim 8, where the preset configuration associated with the first party indicates whether the memory includes a picture associated with the first party, and where the processor is to:

automatically generate the first message when the preset configuration associated with the first party indicates that the memory does not include a picture for the first party.

13. The first communication device of claim 8, further comprising:

an input device to:

receive input for programming an update interval associated with at least some of the plurality of parties, the update interval identifying how often the processor is to automatically generate messages for transmission to the at least some of the plurality of parties, where each of the messages requests a picture.

14. One or more memory devices having stored, thereon, sequences of instructions which, when executed by at least one processor, cause the at least one processor to:

automatically generate, in response to input identifying a first one of a plurality parties or based on a preset configuration, a first message including a first code corresponding to a request for picture code;

forward the first message for transmission to a communication device associated with the first party;

receive a second message from the communication device in response to the first message, the second message comprising:

a second code identifying the second message as being a response to the first message, and a first picture;

store the first picture in a memory;

receive a third message from the communication device, the third message including the first code;

automatically determine that the third message is a request for a picture based on the first code included with the third message; and output information indicating that a picture is requested in response to the third message.

15. The one or more memory devices of claim 14, where the memory comprises a contacts list storing information associated with the plurality of parties, the computer-readable medium further comprising instructions for causing the at least one processor to:

retrieve the first picture for display with information associated with the first party when the contacts list is accessed.

16. The one or more memory devices of claim 14, where, when automatically generating the first message, the instructions cause the at least one processor to:

automatically generate the first message in response to input identifying the first party when the computer-readable medium is in a mode associated with adding pictures to a contacts list that includes the plurality of parties.

17. The one or more memory devices of claim 14, where the memory comprises a contacts list including information associated with the plurality of parties, and when storing the first picture, the instructions cause the at least one processor to:

automatically store the first picture in the contacts list with information associated with the first party without input from a user.

18. The one or more memory devices of claim 14, where, when automatically generating the first message, the instructions cause the at least one processor to:

generate a multimedia message service message.

19. The one or more memory devices of claim 14, further comprising instructions for causing the at least one processor to:

periodically generate messages associated with the plurality of parties based on the preset configuration, the plurality of parties comprising at least a portion of parties included in a contacts list, each of the messages requesting a picture; and forward the messages for transmission to the plurality of parties.

* * * * *